United States Patent
Hurite

[11] Patent Number: 5,971,478
[45] Date of Patent: Oct. 26, 1999

[54] J-STRIP WITH HOOK-AND-LOOP ATTACHMENT FOR TRIM COVER

[75] Inventor: Steve Hurite, Southfield, Mich.

[73] Assignee: Lear Corporation, Southfield, Mich.

[21] Appl. No.: 08/910,142

[22] Filed: Aug. 13, 1997

[51] Int. Cl.⁶ .................................................. A47C 27/00
[52] U.S. Cl. .................................. 297/218.3; 297/218.5; 24/442
[58] Field of Search .................. 297/218.1, 218.3, 297/218.5, 228.13; 241/DIG. 11, 442

[56] References Cited

U.S. PATENT DOCUMENTS

| | | | |
|---|---|---|---|
| 3,176,364 | 4/1965 | Dritz | 24/DIG. 11 |
| 3,180,607 | 4/1965 | Lee | 24/DIG. 11 |
| 3,196,511 | 7/1965 | Kintner . | |
| 3,235,926 | 2/1966 | Mates . | |
| 3,453,696 | 7/1969 | Mates . | |
| 3,981,534 | 9/1976 | Wilton | 297/218.1 |
| 4,140,253 | 2/1979 | Vickers et al. . | |
| 4,352,524 | 10/1982 | Crosby | 297/218.1 X |
| 4,403,366 | 9/1983 | Lucke | 24/442 X |
| 4,666,209 | 5/1987 | Kazaoka et al. | 297/218.3 X |
| 4,706,914 | 11/1987 | Ground . | |
| 4,789,201 | 12/1988 | Selbert . | |
| 4,836,609 | 6/1989 | Hill | 297/218.1 X |
| 5,011,210 | 4/1991 | Inone . | |
| 5,236,243 | 8/1993 | Reyes | 24/442 X |
| 5,277,476 | 1/1994 | Caldwell | 297/218.3 X |
| 5,287,640 | 2/1994 | Morgan | 24/442 X |
| 5,338,092 | 8/1994 | Wiltsey et al. . | |
| 5,382,083 | 1/1995 | Fecteau et al. . | |
| 5,401,075 | 3/1995 | Venuto et al. . | |
| 5,518,292 | 5/1996 | Cozzani | 297/218.5 |
| 5,560,677 | 10/1996 | Cykana et al. | 297/218.5 X |
| 5,658,046 | 8/1997 | Rus . | |
| 5,826,312 | 10/1998 | Schroeder et al. | 297/218.5 X |

FOREIGN PATENT DOCUMENTS

| | | | |
|---|---|---|---|
| 1273849 | 9/1961 | France | 24/442 |
| 25344464 | 4/1984 | France | 297/218.3 |
| 2928473 | 1/1981 | Germany | 297/218.5 |
| 3535353 | 4/1986 | Germany | 297/218.3 |
| 3632278 | 4/1987 | Germany | 297/218.3 |
| 3732836 | 12/1988 | Germany | 297/218.3 |

*Primary Examiner*—Peter M. Cuomo
*Assistant Examiner*—David E Allred
*Attorney, Agent, or Firm*—Brooks & Kushman P.C.

[57] ABSTRACT

A J-strip is adapted for attaching an edge portion of a trim cover material to a vehicle seat frame component. An elongated extruded plastic strip includes a substantially J-shaped cross-section with a flat portion and a curved portion extending from the flat portion. The curved portion is configured to cooperate with the frame component for receiving the frame component therein. A plurality of hooks extend from the flat portion and from the curved portion. A plurality of loops extend from the edge portion of the trim cover for engagement with the plurality of hooks in a hook-and-loop fastener arrangement for securing the trim cover to the frame component such that the trim cover is wrapped at least partially around the curved portion when attached. A method of forming a crease in a seat cover using hook-and-loop fasteners is also provided.

3 Claims, 1 Drawing Sheet

J-STRIP WITH HOOK-AND-LOOP ATTACHMENT FOR TRIM COVER

TECHNICAL FIELD

The present invention relates to a vehicle seat trim cover assembly, and more particularly to a J-strip with a hook-and-loop fastener for a trim cover.

BACKGROUND OF THE INVENTION

Typically, trim covers are attached to seat assemblies by J-strips which are sewn to an edge of the trim cover. The J-strip must be pulled down and flipped up underneath the edge of the seat frame and tucked in behind the frame for attaching the J-strip to the frame. Alternatively, the J-strip must be pulled beneath the frame assembly and attached to a wire within the interior of the frame support.

Such assemblies present significant assembly problems, which result in high assembly costs. Wrapping and tucking the J-strip beneath the seat frame can be a very difficult and time-consuming assembly operation. Also, extra trim cover material is needed in order to allow the J-strip to stretch sufficiently to reach a particular seat frame component to which it is attached.

Accordingly, it is desirable to provide a method of attaching a trim cover to a seat frame component in a manner in which the level of difficulty of assembly is reduced, and the amount of trim cover material required is reduced.

Another aspect of trim cover attachment is the formation of creases on the seat cover. Such creases are typically formed by providing a trench in a foam bun, and providing a wire in the bottom of the trench, and a wire attached to the edge of two trim components. The wires are then hog-ringed together within the trench to form the crease. This hog-ringing and wiring operation is a very expensive assembly operation. Alternatively, a T-shaped slot may be formed in the bun, and a flat plastic insert sewn to the edges of the trim cover, and the insert inserted into the T-shaped slot for securing the trim cover and forming the crease. This too is a difficult and expensive assembly operation.

Another method employs the sewing of two trim components together and wrapping a loop portion of a hook-and-loop fastener around the end portion and sewing the loop portion to the previously sewn trim edges. The hook portion of the hook-and-loop fastener is provided in the bottom of the trench for receiving the loop portion, which is attached to the trim covers for securing the trim cover edges within the trench to form the crease. This operation requires double-sewing, and the loop material which is wrapped around the previously sewn edges of the trim cover is relatively expensive.

Accordingly, it is desirable to provide a method of forming a trim cover crease in a seat cushion in which costs and assembly difficulty are reduced.

DISCLOSURE OF THE INVENTION

A first aspect of the invention overcomes the above-referenced shortcomings of prior art trim edge attachment methods by providing a J-strip with a hook for hook-and-loop attachment of the edge of the trim cover to the seat frame. The J-strip includes a curved portion which extends from a flat portion, each of which includes hooks extending therefrom for attachment to loops protruding from the edge of the trim cover. Accordingly, the trim cover may be easily and quickly attached to the J-strip by pulling it around the curved portion and engaging the hook-and-loop fasteners. The J-strip is pre-attached with the seat frame for such engagement.

More specifically, the first aspect of the invention provides a J-strip adapted for attaching an edge portion of a trim cover material to a vehicle seat frame component. An elongated extruded plastic strip includes a substantially J-shaped cross-section with a flat portion and a curved portion extending from the flat portion. The curved portion is configured to cooperate with the frame component for receiving the frame component therein. A plurality of hooks extend from the flat portion and from the curved portion. A plurality of loops extend from the edge portion of the trim cover for engagement with the plurality of hooks in a hook-and-loop fastener arrangement for securing the trim cover to the frame component such that the trim cover is wrapped at least partially around the curved portion when attached.

A second aspect of the invention provides a vehicle seat assembly with a trim cover crease. A seat cushion bun is provided with a trench formed therein with a trench bottom. One of two hook-and-loop fastener components extends from the trench bottom. The first of the two components is a hook portion and the second is a loop portion. First and second trim cover members are provided with attachment edges adapted for extending into the trench. An extruded plastic edge member includes a flat exposed surface with the other of the two hook-and-loop fastener components extending from the flat surface for selective cooperation with the one hook-and-loop fastener component in the trench bottom. The plastic edge member and the first and second trim cover attachment edges are adapted to be sewn together in a single-step sewing operation, such that the attachment edge is attachable in the trench bottom for creating a trim cover crease between the first and second trim cover members.

Accordingly, an object of the present invention is to provide a J-strip assembly for attaching an edge of a trim cover to a vehicle seat frame in a manner which is easy to assemble and inexpensive to manufacture.

Another object of the present invention is to provide a method and apparatus for providing a crease in a seat between two trim cover components, wherein the means for establishing the crease is inexpensive to manufacture and easy to assemble.

The above objects and other objects, features, and advantages of the present invention are readily apparent from the following detailed description of the best modes for carrying out the invention when taken in connection with the accompanying drawings.

DETAILED DESCRIPTION OF THE PREFERRED EMBODIMENTS

Figure 1:
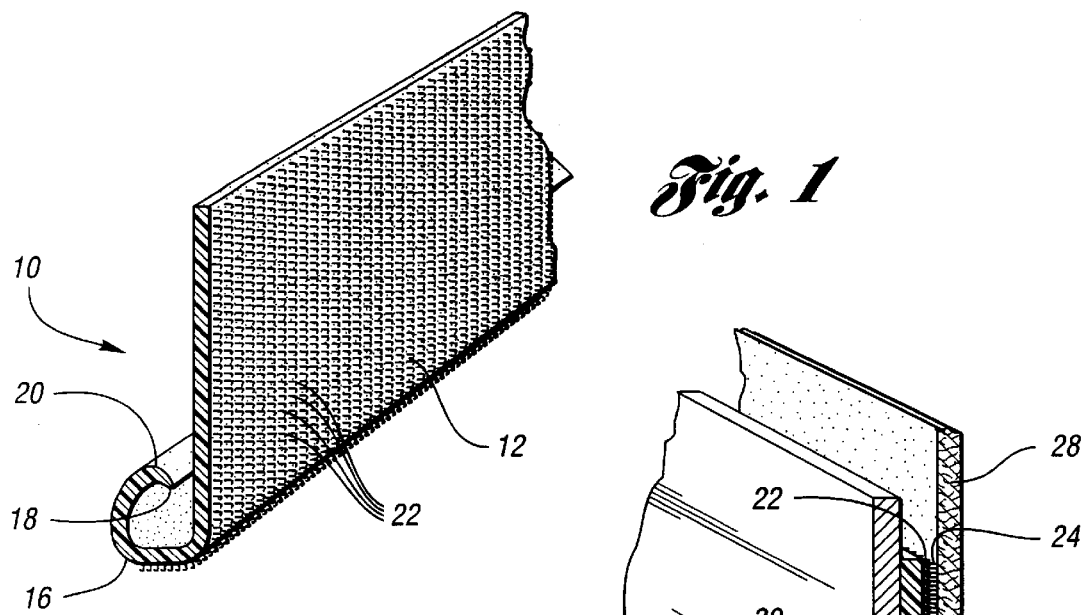
FIG. 1 shows a schematically arranged perspective view of a J-strip adapted for attaching an edge portion of a trim cover material to a vehicle seat frame component in accordance with the present invention.

Referring to FIG. 1, a J-strip 10 is shown in accordance with a first aspect of the present invention for attaching an edge portion of a trim cover material to a vehicle seat frame component. The J-strip comprises an elongated extruded plastic strip 12, which includes a substantially J-shaped cross-section with a flat portion 14 and a curved portion 16 extending from the flat portion 14. A hook edge 18 protrudes inwardly from the distal end 20 of the curved portion 16 such that the curved portion and hook edge return more than 180° toward the flat portion 14 for grasping the frame component.

A plurality of hooks 22 extend from the flat portion 14 and from the curved portion 16.

Figure 2:
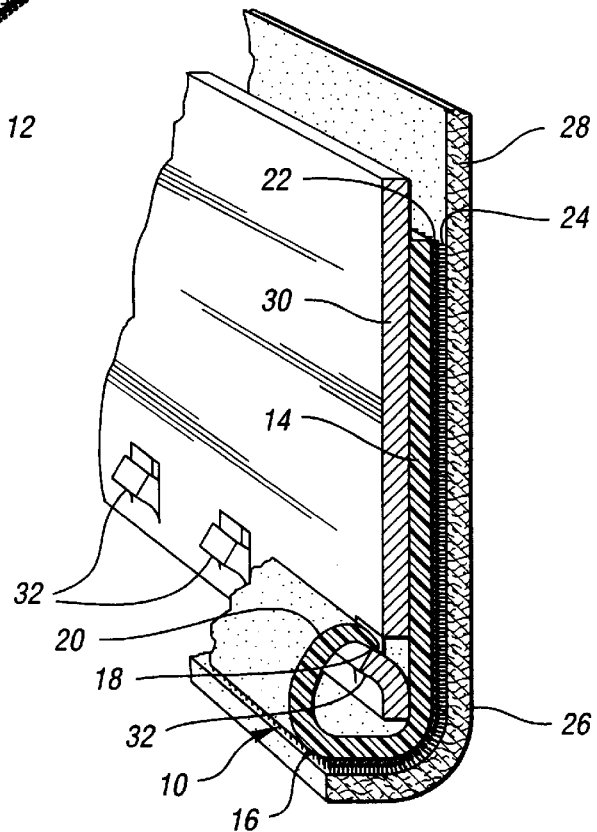
FIG. 2 shows a perspective cross-sectional view of a J-strip assembly attaching a trim cover edge to a seat frame in accordance with the present invention.

Turning to FIG. 2, a plurality of loops 24 extend from the edge portion 26 of the trim cover 28 for engagement with the plurality of hooks 22 in a hook-and-loop fastener arrangement for securing the trim cover 28 to the seat frame component 30 such that the trim cover 28 is wrapped at least partially around the curved portion 16 when attached.

As shown in FIG. 2, the metal, longitudinally extending frame component 30, which is the side rail of a seat cushion frame, includes a plurality of protrusions 32, formed by a partial piercing operation, extending therefrom for cooperation with the hook edge 18 of the J-strip 10 for attachment of the J-strip 10 to the frame component 30.

The hooks 22 protruding from the J-strip 10 may be cemented onto the J-strip 10, or the hooks 22 may be extruded integrally with the J-strip 10 in the manufacturing process.

Accordingly, for assembly, the operator must simply snap the J-strip 10 onto the frame component 30 by engaging the protrusion 32 with the hook edge 18 for attachment. The loops 24 may be sewn onto the edge portion 26 of the trim cover 28. The trim cover 28 is pulled tight around the bottom of the J-strip 10, and the hook-and-loop fastener engagement is made. With the edge portion 26 of the trim cover 28 extending around the curved portion 16 of the J-strip 10, no rough edge of the trim cover is exposed. Of course, the hook-and-loop portions of the hook-and-loop fastener may be switched so that the loops extend from the J-strip and the hooks extend from the trim cover.

Figure 3:
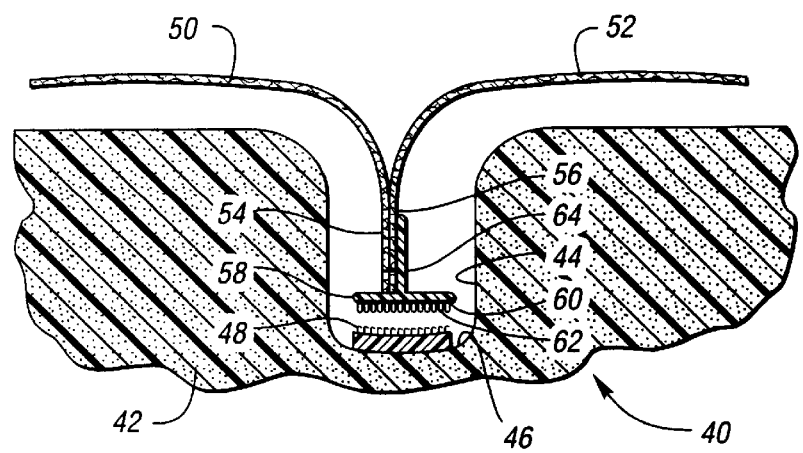
FIG. 3 shows a schematically arranged side view of an apparatus for creating a trim cover crease on a vehicle seat assembly in accordance with a second aspect of the invention.

Turning to FIG. 3, a second aspect of the invention is shown. As shown, a vehicle seat assembly 40 includes a seat cushion bun 42 with a trench 44 formed therein with a trench bottom 46. A hook portion 48 of a hook-and-loop fastener extends from the trench bottom 46. First and second trim cover members 50,52 have attachment edges 54,56, respectively, adapted for extending into the trench 44 for attachment.

An extruded plastic edge member 58 includes a flat exposed surface 60 with a loop portion 62 of a hook-and-loop fastener extending from the flat surface 60 for cooperation with the hook 48 for attachment. The edge member 58 includes an upper portion 64 which is adapted to be sewn together with the attachment edges 54,56 of the trim cover members 50,52 in a single-step sewing operation. Accordingly, the attachment edges 54,56 are attachable in the trench bottom for creating a trim cover crease between the first and second trim cover members 50,52.

By attaching the attachment portions 54,56 of the trim covers 50,52 to the edge member 58 in a single-step sewing operation, the manufacturing process is simplified by eliminating the need to independently sew the attachment edges 54,56 together prior to attachment of the edge member 58. Also, the loops 62 are much less expensive to purchase for attachment to a flat surface as opposed to a curved surface, as discussed in the background section with reference to the prior art. Of course the location of the hook-and-loop portions 48,62 may be reversed.

A method in accordance with the second aspect of the invention for providing a crease in a seat between two trim cover components comprises the following steps: a) providing a seat cushion bun with a trench formed therein having a trench bottom; b) providing a hook portion of a hook-and-loop fastener extending from the trench bottom; c) providing an extruded plastic edge member having a flat exposed surface with a loop portion of a hook-and-loop fastener extending from the flat surface; d) sewing the two trim cover components and the plastic edge member together in a single-step sewing operation; and e) inserting the plastic edge member into the trench for engaging the hook-and-loop fastener portions for drawing the trim cover components into the trench in order to create a trim cover crease.

This method avoids the need for hog-ringing wire attachments, or inserting flat attachment features into a T-shaped groove formed in the bun, which are difficult assembly operations. Using the present invention, the edge member 58 is sewn onto the trim covers 50,52 in a single sewing operation and the assembler pushes the edge member 58 into the trench 44 for engagement with the hooks 48.

Supporting disclosure, and particular seat assembly-specific details for the embodiments described herein may be found in U.S. Pat. Nos. 5,658,046 and 5,236,243, both of which are hereby incorporated by reference in their entirety.

While the best modes for carrying out the invention have been described in detail, those familiar with the art to which this invention relates will recognize various alternative designs and embodiments for practicing the invention within the scope of the appended claims.

What is claimed is:

1. A vehicle seat trim assembly, comprising:
  a seat frame component having an exterior side facing outwardly of the vehicle seat, and an interior side facing inwardly of the vehicle seat;
  an elongated extruded plastic strip having a substantially J-shaped cross-section with an interior surface of a flat portion positioned against the exterior side of the frame component and a curved portion extending from the flat portion, wherein said curved portion is attached to the frame component on the interior side thereof;
  one of two hook-and-loop fastener components attached to exterior surface of the flat portion and the curved portion, the first component comprising a hook portion and the second component comprising a loop portion; and
  a trim cover with an edge portion having the other of said two hook-and-loop fastener components disposed on an interior of the edge portion and cooperating with said one component, said other component securing the trim cover to the frame component by extending only partially around the curved portion whereby to reduce the amount of trim cover material needed for attachment to and concealment of the frame component and said plastic strip.

2. The vehicle seat trim assembly of claim 1, further comprising:
  a protrusion extending from the seat frame component; and
  a hook edge protruding from a distal end of the curved portion for cooperation with said protrusion for grasping the frame component.

3. The vehicle seat trim assembly of claim 2, wherein the curved portion and hook edge in combination return more than 180° toward the flat portion.

* * * * *